United States Patent [19]

Ozawa

[11] Patent Number: 5,440,200
[45] Date of Patent: Aug. 8, 1995

[54] CATHODOLUMINESCENT APPARATUS HAVING A LINEARLY FOCUSED BEAM

[75] Inventor: Ryuji Ozawa, Miyota, Japan

[73] Assignee: Miyota Kabushiki Kaisha, Nagano, Japan

[21] Appl. No.: 941,424

[22] PCT Filed: Mar. 4, 1992

[86] PCT No.: PCT/JP92/00259
§ 371 Date: Oct. 27, 1992
§ 102(e) Date: Oct. 27, 1993

[87] PCT Pub. No.: WO92/16013
PCT Pub. Date: Sep. 17, 1992

[30] Foreign Application Priority Data

Mar. 6, 1991 [JP] Japan ................. 3-65435
Apr. 16, 1991 [JP] Japan ................. 3-112377

[51] Int. Cl.[6] ................. H01J 29/70
[52] U.S. Cl. ................. 313/422; 313/495; 313/496; 313/497
[58] Field of Search ........... 313/422, 495, 496, 497, 313/113, 417, 503, 346 R, 354, 355

[56] References Cited

U.S. PATENT DOCUMENTS

| | | | |
|---|---|---|---|
| 4,044,278 | 8/1977 | Jariwala | 313/417 |
| 4,100,455 | 7/1978 | Dubois | 313/496 |
| 4,270,068 | 5/1981 | Kishino et al. | 313/497 |
| 4,368,404 | 1/1983 | Daisyaku | 313/497 |
| 4,408,143 | 10/1983 | Inohara et al. | 313/422 |
| 4,430,597 | 2/1984 | Thompson | 313/113 |
| 4,622,272 | 11/1986 | Wengert et al. | 313/503 |
| 5,117,159 | 5/1992 | Tomii et al. | 313/422 |
| 5,213,894 | 5/1993 | Kim | 313/467 |

*Primary Examiner*—Anita Pellman Gross
*Assistant Examiner*—Walter J. Malinowski
*Attorney, Agent, or Firm*—Jordan and Hamburg

[57] ABSTRACT

An object of the present invention is to provide a cathodluminescent apparatus, which is capable of adjusting brightness and which is less expensive and economical, and a phosphor powder for the same. The apparatus comprises: a line electron gun having a line cathode and an intermediate electrode, which is capable of extracting electrons from the line cathode, of linearly focusing electrons extracted and of reciprocatively scanning electrons focused; an anode for accelerating electrons emitted from the line electron gun, the anode having an electric conductive section formed on a substrate; a phosphor screen being made of phosphor particles on the electric conductive section; and a container being evacuated to a vacuum for cathodluminescence. The phosphor powder suitably used for the above-described cathodluminescent apparatus should be composed of primary particles of $Y_2O_2S$ polycrystal which are almost spherical with their surfaces formed rough.

11 Claims, 8 Drawing Sheets

CATHODOLUMINESCENT APPARATUS HAVING A LINEARLY FOCUSED BEAM

BACKGROUND OF THE INVENTION

The present invention relates to a cathodoluminescent apparatus and a phosphor powder, more precisely relates to a cathodoluminescent apparatus, which illuminates rooms, liquid crystal display devices as a back light, etc., and which can be used as pixel units of large scale video displays, and a phosphor powder for the same.

Conventionally, fluorescent lights are popularly used as room lights. In the fluorescent lights, the ultraviolet light by discharge of mercury vapor irradiates a phosphor screen formed on an inner face of a glass tube so as to convert to visible light.

Conventional fluorescent lights, however, have some disadvantages.

Brightness of the phosphor screen will be increased, if the intensity of the ultraviolet light is increased, but the temperature of the mercury vapor is restricted by physical conditions, so that brightness of the fluorescent light is limited. Therefore, illumination level in rooms is controlled by only the number of fluorescent lights.

To make a plane light source with fluorescent lights, a plurality of fluorescent lights must be arranged in parallel, because fluorescent lights are line light sources, so that the cost must be increased.

Further, the above-mentioned phosphor screen is formed by applying onto a substrate a slurry composed mainly of a mixture of an organic binder solution, such as cellulose nitrate solution, and phosphor powders.

The best fluorescent substance for the slurry application method is such one as is capable of dispersing well in the slurry and producing high light scattering in the phosphor screen in dry state.

In connection with the above, the conventional phosphor powders contain small single crystals in quantity, have low coefficients of light scattering, and have weak strengths of adhesion onto substrates. Owing to these properties, those phosphor screens for which the conventional phosphor powders are used, have encountered a problem with pinholes.

An object of the present invention is to provide a cathodoluminescent apparatus, which is capable of adjusting brightness and which is less expensive and economical, and a phosphor powder, which has tough strength of adhesion onto substrates and high coefficients of light scattering in a dry phosphor screen.

The inventor thought that the object could be achieved by cathodoluminescence, and reached the present invention. The present invention has following structures.

Firstly, the apparatus comprises:

a line electron gun having a line cathode, which is elongated in a first direction, and an intermediate electrode, which is capable of extracted electrons from the line cathode, of linearly focusing electrons extracted, and of reciprocatively scanning electrons focused in a second direction perpendicular to the first direction;

an anode for accelerating electrons emitted from the line electron gun, the anode having an electric conductive section formed on a substrate, wherein voltage is applied thereto for the acceleration;

a phosphor screen being made of phosphor particles on the electric conductive section; and a container being capable of accommodating the line electron gun and the anode, the container having a light emitting face, through which visible light is capable of passing, the container being evacuated to a vacuum for cathodoluminescence.

With this structure, brightness of luminescence on the phosphor screen can be adjusted by the voltage applying to the intermediate electrode.

Moreover, because the line electron gun focuses and reciproctively scans electrons extracted, a plane light source can be realized with one line electron gun.

On the other hand, the phosphor powder suitably used for the above-described cathodoluminescent apparatus should be composed of primary particles of $Y_2O_2S$ polycrystal which are almost spherical with their surfaces formed rough and about 4.5 $\mu$m in median diameter so as to pass, for example, through a 400-mesh sieve.

DETAILED DESCRIPTION OF THE PREFERRED EMBODIMENTS

Preferred embodiments of the present invention will now be described in detail with reference to the accompanying drawings.

Firstly, a structure of a cathodoluminescent apparatus is explained.

Figure 1:
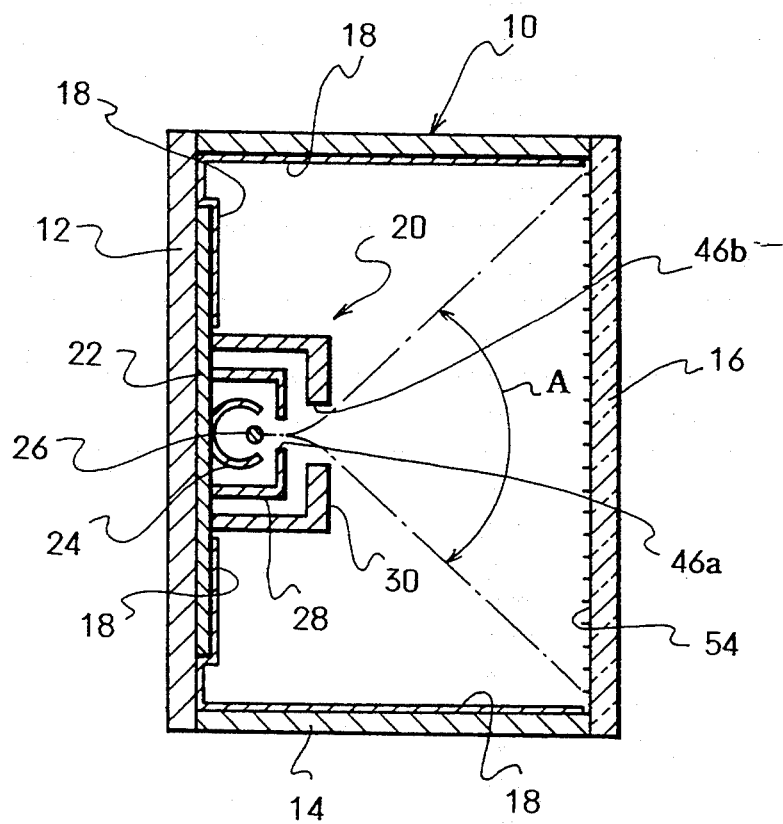
FIG. 1 is a side sectional view of a cathodoluminescent apparatus of an embodiment.

In FIG. 1, symbol 10 shows a housing, which is an example of containers, and which has a first wall section 12, a second wall section 14 and a transparent section 16. At least the transparent section 16, whose outer face is an emitting face through which the visible light is passed outward, is made of transparent materials, e.g. glass. The first wall section 12 and the second wall section 14 may be made of anti-heat materials, e.g. opaque metals. An inner space of the housing 10 is evacuated to a proper vacuum for cathodoluminescence.

Symbol 18 is a reflector formed on inner faces of the first wall section 12 and the second wall section 14. The reflector 18 reflects a part of light, which is emitted from a phosphor screen toward the inner faces of the housing 10, not the transparent section 16, so as to introduce it to the transparent section 16, so that the brightness of the light emitted from the transparent section 16 can be higher. The reflector 18 may be, for example, an evaporation layer of aluminum, silver, chromium, etc.

Symbol 20 is a line electron gun, which is fixed on the inner face of the first wall section 12. The line electron gun 20 has a base board 22, a control electrode 24, a line cathode 26, a first intermediate electrode 28 and a second intermediate electrode 30. A front view of the line electron gun 20 is shown in FIG. 2.

Figure 2:
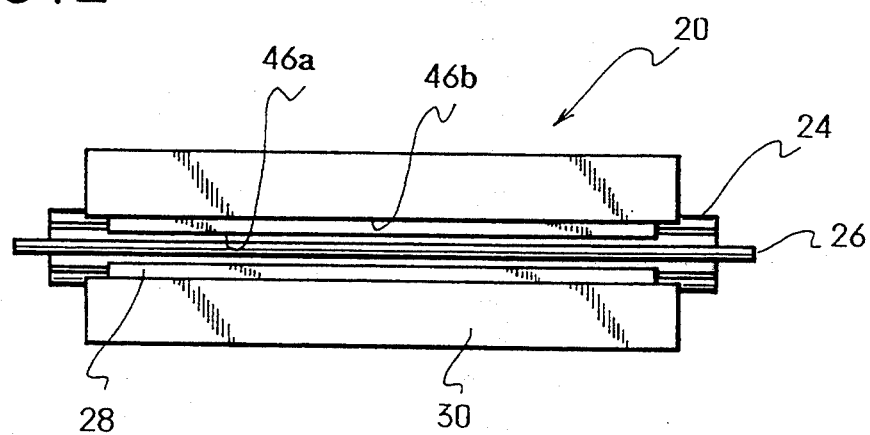
FIG. 2 is a front view of a line electron gun of the apparatus.

The line cathode 26 is provided to release electrons, and is elongated in a first direction (the right-left direction in FIG. 2). To uniformly release electrons in a broad area, the line cathode 26 is formed into an elongated shape. The line cathode 26 may be made of a wire resistance, e.g. tungsten, whose outer face is coated with cathode materials, e.g. an alkali earth carbonate. A mere wire resistance without the cathode material may be used for the line cathode 26 but it is apt to transform by heat expansion. Additionally, the area of wire resistance without the cathode material is smaller, so that the amount of electrons to be released must be fewer. Therefore, in the present embodiment, the line cathode 26 has a structure shown in FIGS. 3 and 4.

Figure 3:
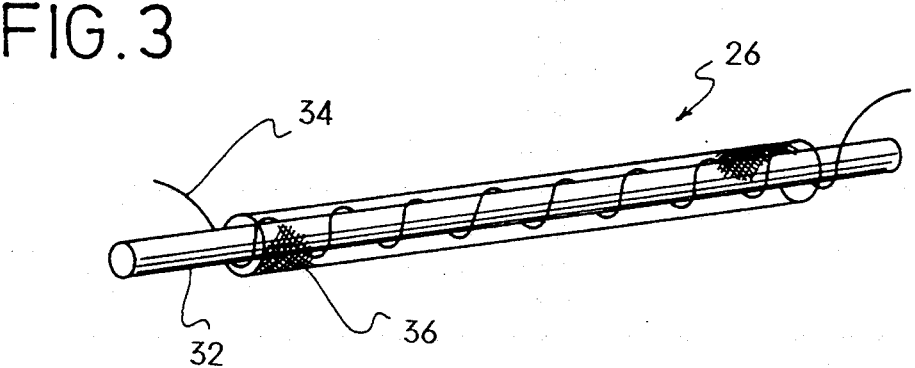
FIG. 3 is a perspective view of a line cathode of the electron gun.

In FIG. 3, symbol 32 is a ceramic core made of ceramics, e.g. aluminous ceramic, zirconic ceramic. The ceramic core 32 may be made by melting ceramics, but it is difficult to melt ceramics because of their high melting temperature. Then, in the present embodiment, the ceramic core 32 is made by uniformly coating a ceramic powder on an outer face of a high melting wire resistance, which does not react to the ceramic powder, e.g. tungsten, molybdenum, zirconium, and sintering the ceramic powder. The ceramic core 32 must have a large enough diameter, which is capable of preventing the ceramic core 32 from hanging down and breaking.

The diameter should be 0.1 mm—3 mm, preferably 0.3 mm—2 mm, more preferably 1.0 mm±0.5 mm.

Symbol 34 is a wire heater for heating the line cathode 26. The wire heater 34 is a wire resistance, which is winded round the outer circumferential face of the ceramic core 32. In the line cathode 26, under operating temperature ±10° C., heat distribution should be uniform in the axial direction so as to uniformly release electrons. To uniformly release electrons, the wire heater 34 is uniformly and densely winded round the ceramic core 34. By winding the wire heater 32, the transformation thereof can be prevented, and the surface area thereof can be broader, so that the amount of electrons to be released can be increased.

Symbol 36 is a cathode material coating the outer circumferential face of the wire heater 34. The cathode material 36 is a material of oxides, e.g. an alkali earth carbonate. When the cathode material 36 is heated under the vacuum condition of at or less than $10^5$ torr, the cathode material 36 changes to an oxide. The oxide heated releases electrons.

Figure 4:
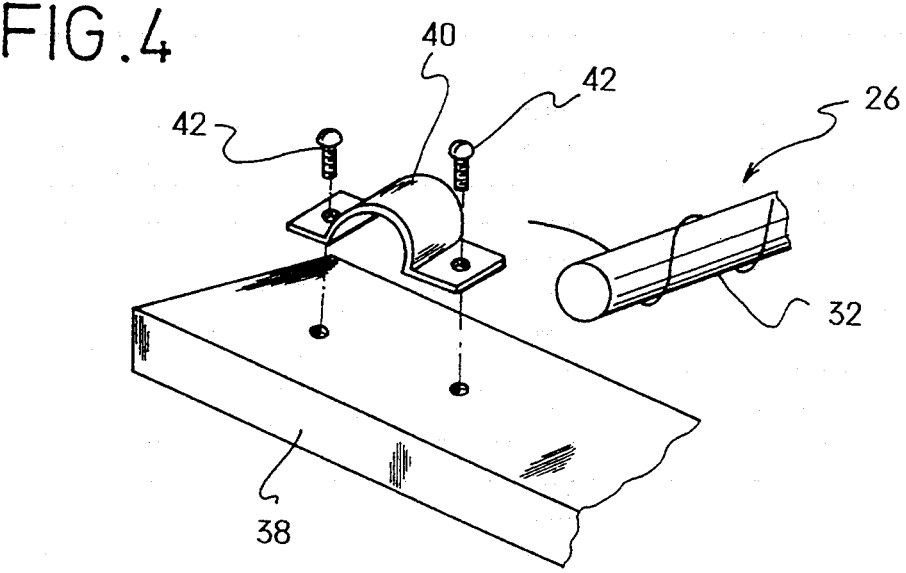
FIG. 4 is a perspective view showing a method of attaching the line cathode.

The line cathode 26 is fixed as shown in FIG. 4. One end of the ceramic core 32 is fixed on a base 38; the other end is loosely attached for heat expansion thereon by a clasp 40 and bolts 42. The base 38 is fixed on the base board 22 of FIG. 1 (the base 38 is not shown in FIG. 1).

Figure 5:
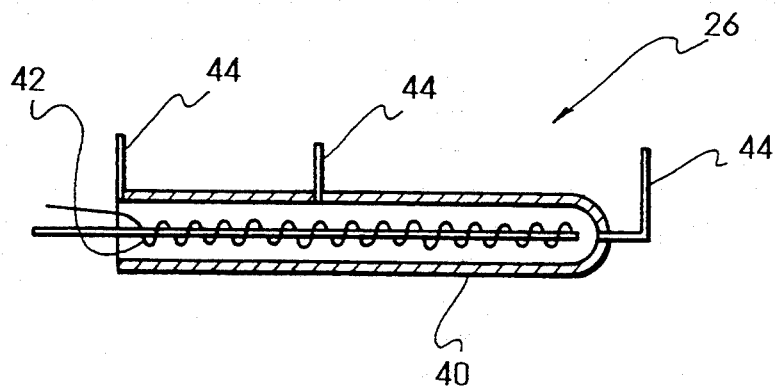
FIG. 5 is a sectional view showing another example of a line cathode.

Another example of the line cathode 26 is shown in FIG. 5.

In FIG. 5, the line cathode 26 has a hollow metal cylinder 40, whose outer circumferential face is coated with the cathode material, and a coil heater 42 which is accommodated in the cylinder 40. The melting point of the cylinder 40 is higher than that of the cathode material, and the cylinder 40 is formed by a thin metal plate, e.g. nickel, nickel alloy, which does not react with respect to the cathode material so as to keep the function of the cathode. Both ends or one end of the cylinder 40 may be opened. The coil heater 42 is made of a wire heater, e.g. tungsten wire. The ceil heater 42 may be coated with sintered powders, e.g. alumina, magnesia, which has an insulating function under a high temperature condition for preventing a short circuit. The whole outer face of the cylinder or a front part thereof, which electrons are released, may be coated with the cathode material. The cylinder 40 may be supported and fixed by a plurality of arms 44.

In each line cathode 26, the length of the line cathode 26 in the first direction is equal to or slightly longer than that of the phosphor screen (described later). Having an elongated form, the line cathode 26 is capable of releasing much electrons. During operation, the line cathode 26 is continuously heated, so that electrons are continuously released therefrom.

In FIGS. 1 and 2, the first intermediate electrode 28 of the line electron gun 20 is provided to extract electrons from said line cathode 26. The first intermediate electrode 28 is elongated in the first direction as well as the line cathode 26, and has a slit 46a in the front part. Pulse voltage is applied to the first intermediate electrode so as to extract thermoelectrons from the line cathode 26. Heat electrons extracted from the line cathode 26 irradiate the phosphor screen to cause illumination.

However, this illumination is not so bright. To have enough brightness, there is provided the second intermediate electrode 30, which is capable of linearly focusing electrons extracted and reciprocatively scanning electrons focused in a second direction (the up-down direction in FIG. 1) perpendicular to the first direction. Scanning angle is shown as angle A. The focusing and the scanning are executed by applying AC voltage, e.g. sine waves, to the second intermediate electrode 30. The second intermediate electrode 30 is elongated in the first direction as well as the line cathode 26, and has a slit 46b in the front part.

Since the first intermediate electrode 28 and the second intermediate electrode 30 have elongated shapes, it is sometimes difficult to precisely assemble. If the locating accuracy of the first intermediate electrode 28 and the second intermediate electrode 30 is low, uneven distribution of electron density is caused, so that the phosphor screen does not illuminate uniformly. This problem can be solved by providing the control electrode 24. The control electrode 24 is provided on the base board 22 near the line cathode 26. The control electrode 24 has a half cylindrical shape having a slit in the front part, and partly rounds the line cathode 26. Having the half cylindrical shape, even though the line cathode 26 is thick, the control electrode 24 is capable of controlling the extraction and illuminating the phosphor screen uniformly.

In the embodiment shown in FIGS. 1 and 2, a couple of electrodes—the first intermediate electrode 28 and the second intermediate electrode 30—are provided as the intermediate electrode, but the intermediate electrode is not limited to above described structure. Next, the intermediate electrodes having other structures will be explained.

Figure 6:
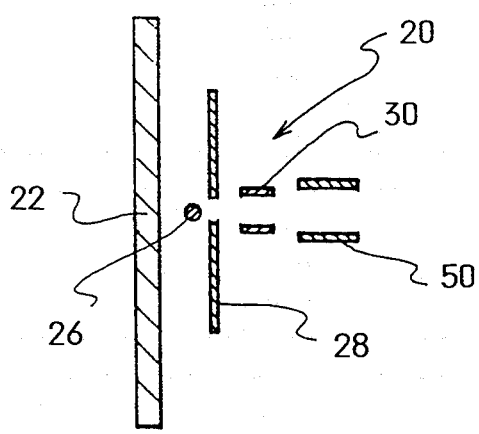
FIG. 6 is an explanation view showing another example of an intermediate electrode of the line electron gun.

In FIG. 6, the intermediate electrode has the first intermediate electrode 28 for extracting electrons from the line cathode 26, the second intermediate electrode 30 for linearly focusing electrons extracted in the first direction, and a third intermediate electrode 50 for reciprocatively scanning electrons linearly focused in the second direction. Extracting, focusing and scanning are respectively executed by each electrode, so that higher accuracy control can be possible. The previously mentioned control electrode may be added to the example shown in FIG. 6.

Figure 7:
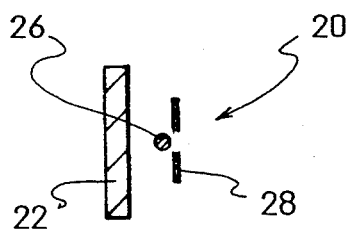
FIG. 7 is an explanation view showing another example of the intermediate electrode of the line electron gun.

In FIG. 7, the intermediate electrode has the simplest structure. The intermediate electrode has only one electrode 28 for extracting electrons from the line cathode 26 and Focusing electrons extracted. When voltage of zero or ± nearly zero with respect to the line cathode 26 is applied to the electrode 28, thermoelectrons are extracted from the line cathode 26. The extraction is controlled by the electrode 28, but the distribution of electrons may be uneven, so that the range of use should be limited.

Figure 8:
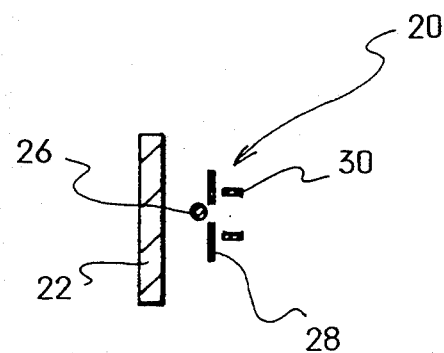
FIG. 8 is an explanation view showing another example of the intermediate electrode of the line electron gun.

An example shown in FIG. 8 is capable of overcoming the disadvantage of FIG. 7. Its basic structure is similar to the example shown in FIGS. 1 and 2. Namely, the intermediate electrode has the first intermediate electrode 28 for extracting electrons from the line cathode 26, and the second intermediate electrode 30 for linearly focusing electrons extracted in the first direction and reciprocatively scanning electrons linearly focused in the second direction. Pulse voltage, for example, is applied to the first intermediate electrode 28 to extract electrons; high voltage is applied to the second intermediate electrode 30 to focus and reciprocatively scan electrons.

Figure 9:
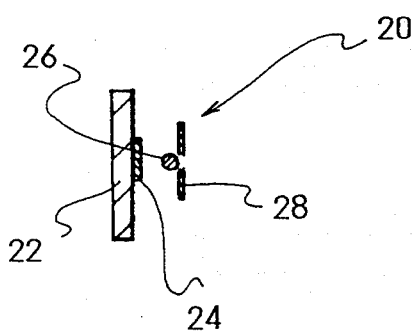
FIG. 9 is an explanation view showing another example of the intermediate electrode of the line electron gun.

An example shown in FIG. 9 has the control electrode 24 having a plane shape. The function of the control electrode 24 is the same as the example shown in FIGS. 1 and 2. This example is preferable in case of having a thin line cathode 26.

Figure 10:
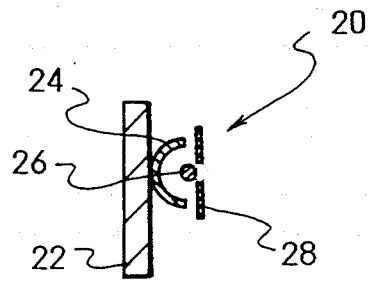
FIG. 10 is an explanation view showing another example of the intermediate electrode of the line electron gun.

An example shown in FIG. 10 has the intermediate electrode shown in FIG. 7 and the control electrode shown in FIGS. 1 and 2.

In each example of the intermediate electrode, the amount of electrons to be extracted can be controlled by adjusting voltage applied to the intermediate electrode, so that the brightness of the phosphor screen can be controlled.

The line electron gun 20 is capable of linearly focusing electrons extracted in the first direction by the intermediate electrode, and reciprocatively scanning electrons focused in the second direction, on the phosphor screen, so that a plane light source can be realized with one line electron gun.

Note that, in this embodiment, the electrodes except, the second intermediate electrode 30 which has the thickness of at or less than 5 mm, are made of thin metal plates whose thickness is at or less than 2 mm, so that the total thickness of the line electron gun can be at or less than 15 mm. Thus a thinner cathodoluminescent apparatus can be realized. The scanning angle depends on the voltage applied to the intermediate electrode. The higher the voltage rises, the wider the scanning angle is. The scanning angle depends on the distance between the line electron gun 20 and the transparent section 16, too. Therefore, to make a thin, e.g. 3 cm, apparatus, the scanning angle should be larger. In other words, the cathodoluminescent apparatus having optional thickness can be realized by adjusting the scanning angle.

Next, the phosphor screen and an anode formed on the inner face of the transparent section 16 of the housing 10 (see FIGS. 1 and 2) will be explained with respect to FIG. 11.

Figure 11:
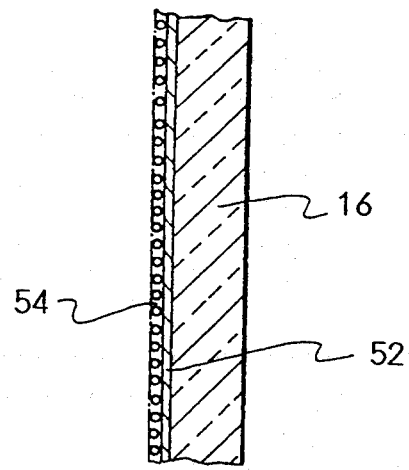
FIG. 11 is a partial sectional view showing an anode and a phosphor screen.

In FIG. 11, the glass forming the transparent section 16 serves as a extrate of the anode. There is formed the anode 52, which is a layer made of an optical transparent material, e.g. indium tin oxide, on the inner face of the transparent section 16. Voltage, e.g. 2 KV, for accelerating electrons irradiated from the line electron gun 20 is applied to the anode 52. Furthermore, when plus voltage is applied to the reflector 18, which is coated with metal, a uniform plus-electric field is formed in the housing 10, so that the scanning can be controlled easier. In this case, the electric potential of the reflector 18 which is provided rear side of the line cathode 26 (the left side in FIG. 1) should be the same as that of the cathode.

The phosphor screen 54, which is made of a phosphor powder (particles), is formed on the inner face of the anode 52 which is an electric conductive layer. When thermoelectrons collide against the phosphor screen 54, the energy of the electrons is converted into light, so that the phosphor screen 54 illuminates. In case of forming the phosphor screen 54 on an electric conductive material, the brightness is increased about 50% with respect to the phosphor screen formed on a non-electric conductive material. Therefore, in the example shown in FIGS. 1 and 2, the phosphor screen 54 is formed on the anode 52 made of an electric conductive material. Since the substrate 16 is optically transparent and the phosphor screen 54 has a proper thickness, e.g. 4 $mg/cm^2$, the illuminated light can be effectively introduced outward through the transparent section 16.

Chemical structure of the phosphor screen 54 will be explained later but brightness of the phosphor screen 54 depends on conditions of thermoelectrons, e.g. voltage applied to the anode 52, density, irradiating period. Especially by continuous irradiation of highly dense electrons, the phosphor powder is heated. Upon reaching a prescribed temperature, the brightness of the phosphor powder is quickly decreased. Therefore, overheating of thermoelectrons caused by focusing electrons must be prevented.

On the other hand, in case of irradiating electrons having quite high density for short period of time like pulses, the phosphor powder brightly illuminates without temperature rise. Then, in the present embodiment, the phosphor screen 54 is irradiated, like pulses, and scanned in the second direction by electrons focused, so that the phosphor powder brightly illuminates without overheating.

Successively, other embodiments of the cathodoluminescent apparatus will be described. Note that, elements which have been explained in the former embodiment are assigned the same symbols, and explanation will be omitted.

Figure 12:
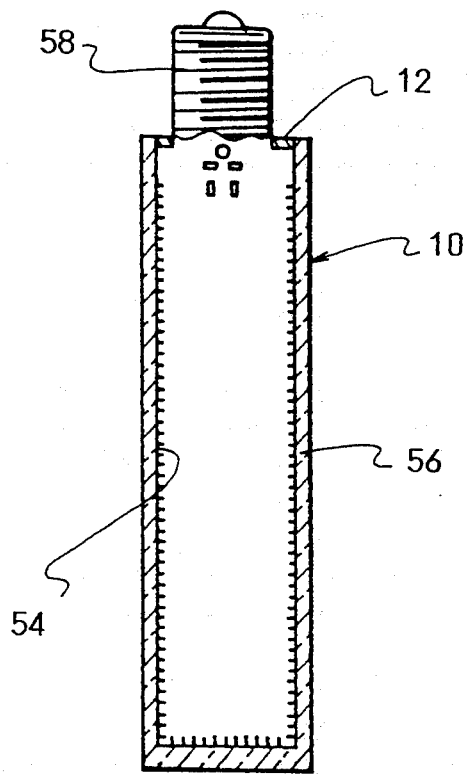
FIG. 12 is a front sectional view of another embodiment of the apparatus.

In FIG. 12, the apparatus has a container 56, whose front face and outer circumferential face are made of transparent glass like a light bulb. The apparatus has a socket section 58 as electrodes to which voltage is applied. If the shape and the size of the socket section 58 are standardized, the apparatus would be capable of wide use.

Figure 13:
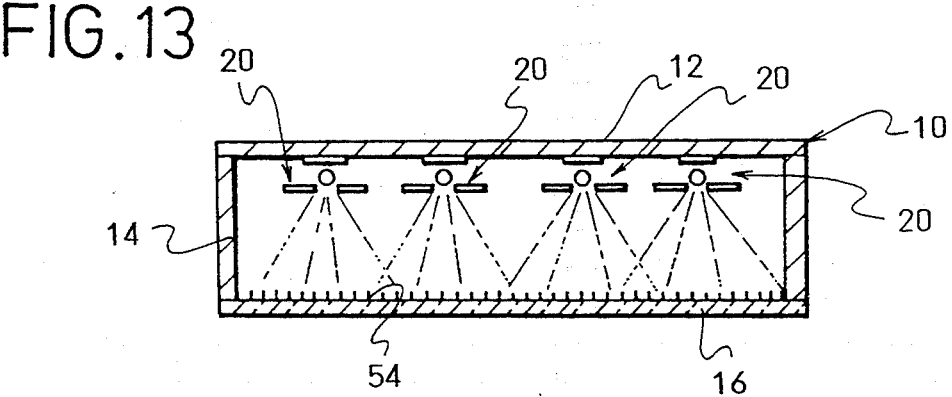
FIG. 13 is a plan sectional view of another embodiment of the apparatus.

In FIG. 13, the apparatus has a plurality of, e.g. four, line electron guns 20. Intermediate electrodes are mutually connected in series or in parallel, and control electrodes, are also mutually connected in series or in parallel. With this structure, each line electron gun 20 can be synchronized, so that no flickers are caused because of no time lag of illumination.

Figure 14:
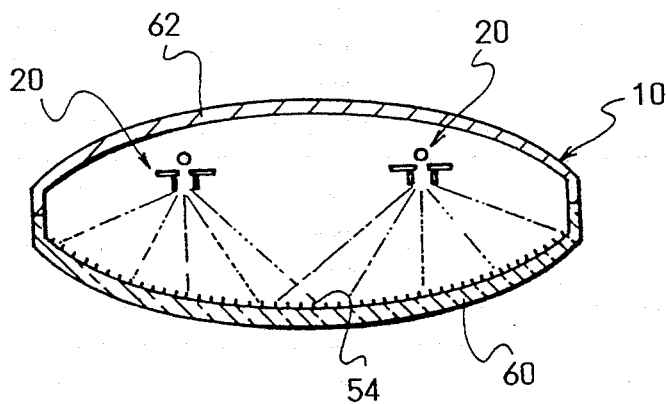
FIG. 14 is a plan sectional view off another embodiment of the apparatus.

In FIG. 14, one or a plurality of line electron guns 20 are accommodated in a glass housing 10, which has a curved face. The width of the apparatus is determined by the degree of vacuum resistance. A wide apparatus must be made of thick glass, so that its weight is heavier. To reduce the weight, a curved glass plate may be adopted to a housing. The phosphor screen 54 is formed on a transparent or semitransparent glass plate 60, which is provided on the front side, the line electron guns 20 are set on a glass plate 62, which is provided on the rear side. Illuminated light is introduced outward through the front glass 60.

Locations of the line electron guns 20 in the housing 10 are not limited, and any locations from which the line electron guns 20 are capable of irradiating the phosphor screen 54 are allowed.

Figure 15:
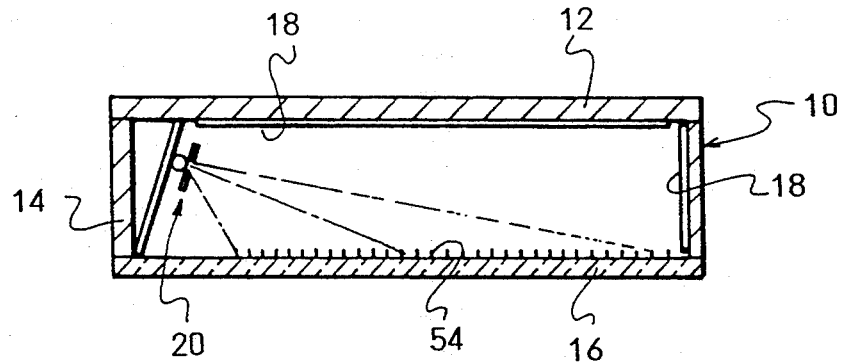
FIG. 15 is a plan sectional view of another embodiment of the apparatus.
Figure 16:
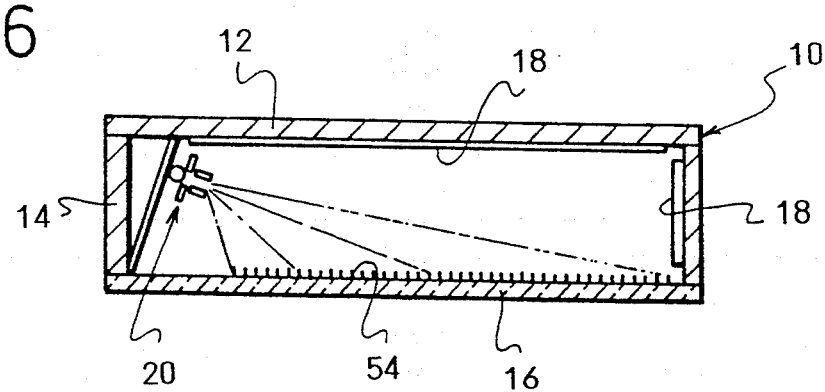
FIG. 16 is a plan sectional view of another embodiment of the apparatus.

In FIGS. 15 and 16, the line electron guns 20, which are the same as those shown in FIG. 7 or 8, are diagonally set in the housing 10. By diagonally setting the line electron guns 20, irradiating efficiency to the phosphor screen 54 can be increased. In these embodiments, the reflectors 18 prevent uneven illumination caused by uneven electron density. Note that, the structure of the line electron guns 20 is not limited to that shown in FIG. 7 or 8.

Figure 17:
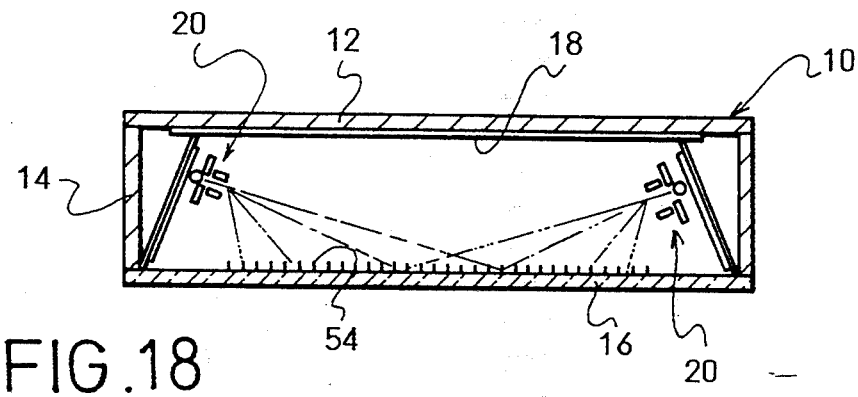
FIG. 17 is a plan sectional view of another embodiment of the apparatus.

In FIG. 17, a couple of line electron guns 20 are diagonally set at each end of the housing 10. As well as the embodiments shown in FIGS. 15 and 16, irradiating efficiency to the phosphor screen 54 can be increased by diagonally setting the line electron guns 20. Moreover, there is also provided the reflector 18 on the inner face of the housing 10.

Figure 18:
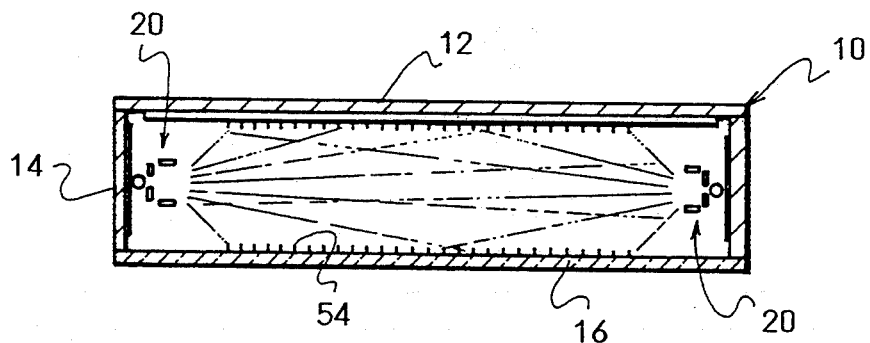
FIG. 18 is a plan sectional view of another embodiment of the apparatus.

In FIG. 18, the phosphor screens 54 are formed on the inner face of the transparent section 16, which is provided on the front side of the housing 10, and on the inner face of the first wall section 12, which is provided on the rear side thereof. The line electron guns 20 are respectively set at each end of the housing 10 to face each other. By providing two phosphor screens 54, illumination area can be increased and the brightness of the apparatus can be increased.

Figure 19:
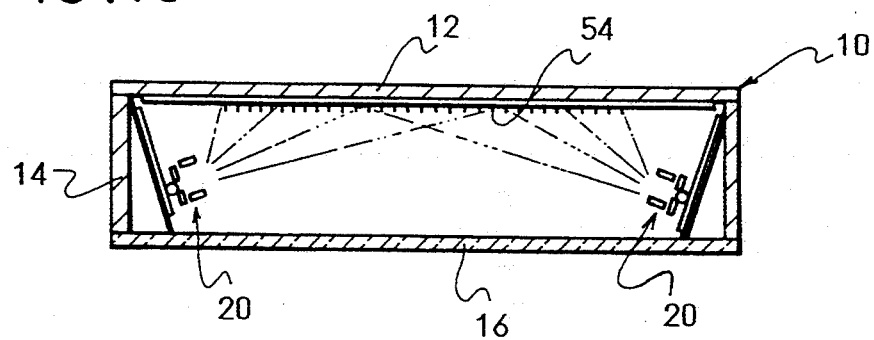
FIG. 19 is a plan sectional view of another embodiment of the apparatus.

In FIG. 19, the phosphor screen 54 is formed on the inner face of the first wall section 12, not on the transparent section 16. Electrons are repeatedly irradiated from two line electron guns 20, which are diagonally set at each end of the housing 10. Light illuminated from the phosphor screen 54 is introduced outward through the transparent section 16, which has no phosphor screen on the inner face. Note that, in FIGS. 18 and 19, the thickness of the phosphor screen 54, which is formed on the inner face of the first wall section 12, can be thicker since the phosphor screen 54 does not affect the introduction of light.

Figure 20:
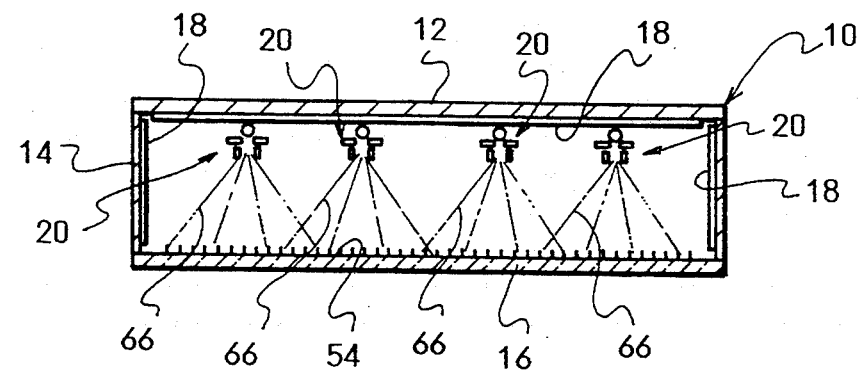
FIG. 20 is a plan sectional view of another embodiment of the apparatus.

An embodiment shown in FIG. 20 is a modified embodiment of the embodiment shown in FIG. 13. The present embodiment has added the reflectors 18. Scanning ranges of the line electron guns 20 are partly overlapped. To prevent uneven brightness, which is caused by the overlapping, the intermediate electrodes of the line electron guns 20 may be connected in parallel. With this parallel connection, electrons irradiated from the line electron guns 20 can be synchronously scanned in the same directions, so that uneven illumination can be prevented.

In the cathodoluminescent apparatus of the present invention, light illuminated from the phosphor screen 54 is introduced outward through the transparent section 16, so that a plane light source is created which is capable of lighting with diffused light. In case of using this plane light source in houses or offices as room lights, the apparatus may be fixed on walls or ceilings. The apparatus can be also used as lamps instead of conventional lamps. In case of using as lamps, the apparatus may have the structure shown in FIG. 12, which has a socket section for wide use.

Successively, examples employing the present invention will be explained.

A thin cathodoluminescent apparatus is suitable for a back light of liquid crystal display units (LCD). In case of the back light of LCDs, momentary brightness of the phosphor powder is more important than mean plane-brightness. Momentary brightness of the phosphor powder, which is scanned by focused electrons is 100 times or more as much as the mean plane-brightness. Therefore, if addressing points of an LCD and addressing points of the phosphor screen 54 are synchronized, the addressing points of the LCD can be irradiated by bright light.

The cathodoluminescent apparatus is also capable of using a pixel of a large scale monochrome or color display device. The device has multiple pixels, which are arranged in an X-Y matrix form, and selected pixels are illuminated by an X-Y addressing method so as to form images. Cathodluminescent apparatuses of above described embodiments can be adopted to the pixel. To display video images on the display device, video signals are applied to each control electrode 24 of each cathodoluminescent apparatus.

Figure 21:
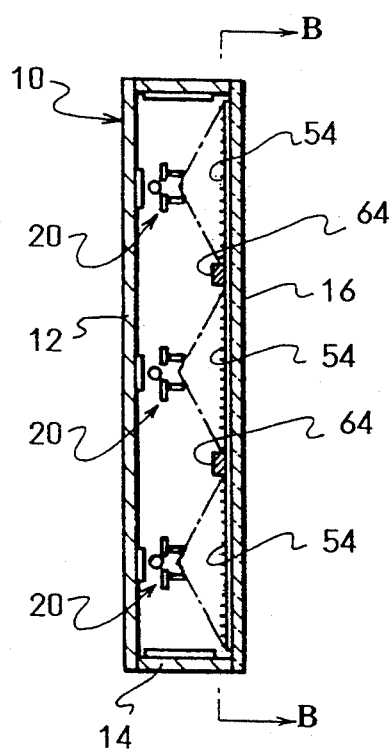
FIG. 21 is a plan sectional view of another embodiment of the apparatus.
Figure 22:
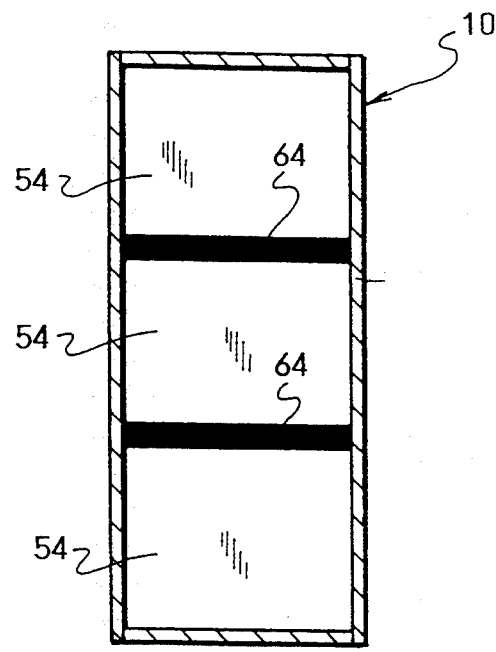
FIG. 22 is a sectional view taken along line B—B of FIG. 21.

Furthermore, a plurality of phosphor screens, which have the same color or different colors, can be formed in one cathodoluminescent apparatus. In FIGS. 21 (side sectional view) and 22 (sectional view the housing 10 taken along line B—B), the cathodoluminescent apparatus has three phosphor screens 54, each phosphor screen 54 is partitioned by black members 64, which are made of carbons. Note that, a broad phosphor screen 54 may be divided by the black members 64. The number of the line electron guns 20 is equal to that of the phosphor screens 54, and each line electron gun 20 irradiates the phosphor screen 54 corresponding thereto. Therefore, the length of the line electron guns 20 should be equal to or slightly longer than the phosphor screens 54 because one line electron gun 20 scans one phosphor screen 54. By controlling electric potential of each control electrode 24 of each line electron gun 20, illumination of each phosphor screen 54 can be controlled, so that the apparatus can be used as three pixels of the display device. Furthermore, if the three phosphor screens 54 are respectively coated with red, green and blue phosphor powders, they can be used as one color pixel. A color display unit can be realized by arranging multiple color pixels in an X-Y matrix form.

Figure 23:
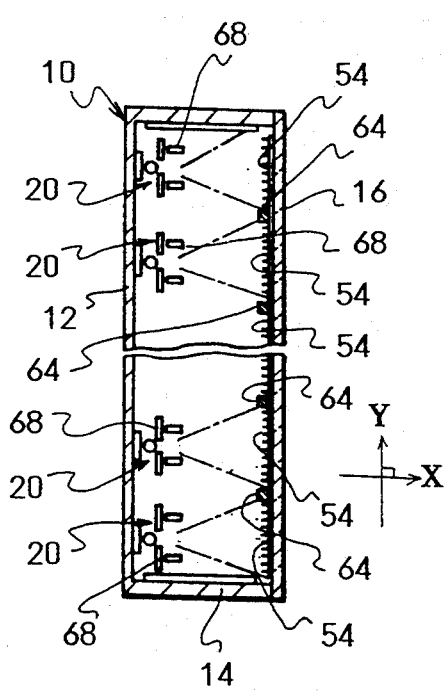
FIG. 23 is a side sectional view of another embodiment the apparatus.
Figure 24:
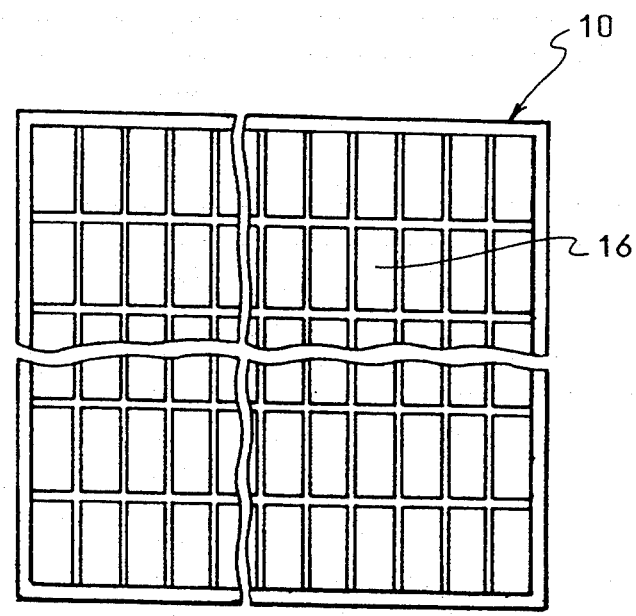
FIG. 24 is a front view of the apparatus of FIG. 23.

A large display device, e.g. an electric bulletin board, will be explained with reference to FIGS. 23 (side sectional view) and 24 (front view). As to one line cathode 26, which is included in one line electron gun 20 and arranged in an X-direction, the extraction range, which corresponds to one phosphor screen 54, is divided into a plurality of groups in the X-direction. Namely, a plurality of control electrodes 24, each of which corresponds to each said group, are provided to said one line electron gun 20. With this structure, one phosphor screen 54, which corresponds to one line electron gun 20, is divided into said groups, so that the extraction is independently executed group by group, and the phosphor screen 54 can be independently illuminated group by group. A plurality of intermediate electrodes 68 are, of course, provided to each control electrode 24. Furthermore, a plurality of other line electron guns 20, whose structure is the same as that of said gun 20, are also provided in a Y-direction. A transparent section 16, or a displaying face, is divided into multiple groups in the X- and Y-directions like a matrix form. Thus, one phosphor screen 54, which can be illuminated group by group. The groups are partitioned by black members 64, which are provided on the phosphor screen 54. With X-Y matrix form of the groups, the display device can be used as an electric bulletin board. If this display device is used as a pixel or a part of a larger display device, brightness and resolving power can be higher. The phosphor screen 54 may be colored any optional colors for a color display device.

In the cathodoluminescent apparatus of the present invention, the emission intensity depends not only on the energy amount given in unit time but also greatly on the phosphor powder composing the phosphor screen.

For the above reason, in what follows, the phosphor powders suitably used for the cathodoluminescent apparatus will be described together with the method for their preparation.

First, suitable amounts of component compounds for the fluorescent substance and flux, e.g., $Y_2O_3$, an activator compound determining the emission color such as $Eu_2O_3$, powdery sulfur, and a carbonate of alkali metal as the flux, are weighed in a dry room. The weighed mixture is mixed in a V-shaped mixer, ball mill, or else so as to form a uniform mixture.

The essence of flux is sodium sulfide (NaSx) formed by the reaction of sulfur with alkali metal salt. Presence of lithium sulfide ($Li_2S$) in NaSx is indispensable for the growth of spherical particles. When the NaSx flux contains lithium (Li) ion at an adequate concentration, the speed of growth of $Y_2O_2S$ crystal is increased, and polycrystals containing a large quantity of crystal growth axes grow more rapidly than single crystals. If the NaSx flux contains potassium (K) ion, plate crystals of $Y_2O_2S$ grow selectively and in such an amount as depends on the amount of K ions. Therefore, it is undesirable to add K beyond a certain limit value (e.g., 5 wt %). The mixing of Li ion in the raw material mixture may be effected by using such Li compounds as are decomposed when heated and react with sulfur in the mixture to form $Li_2S$, e.g., $Li_2CO_3$, $Li_3PO_4$, and LiOH.

The optimum amount of the Li ion to be contained in NaSx is in such a wide range as to have no sensitive effect. When the amount of LiSx contained in the whole of flux is in the range of 5 to 60%, spherical particles may be obtained, increase in the amount of Li causes the mixture to be tightly sintered after calcination. If the sintered strength is high, the flux is hard to be removed completely. To relieve this difficulty, the content of $Li_2S$ should desirably be in the range of 20 to 50%, the most desirable range being between 30% and 40%. With a view to make the sintering effect mild, it is effective to add $K_2Sx$ in about 5%.

In order to obtain phosphor powder with good reproducibility, it is effective to mix the powders of raw materials uniformly. For the uniform mixing of the powdery raw materials, each particle of the powdery raw materials to be mixed should desirably have almost the same weight (mass). If the particles of the powdery raw materials to be mixed are largely different in mass from one another, the result of mixing, even if the mixing time gets prolonged, displays a deviated distribution due to the difference in mass among powders, always leading to a heterogeneity. The non-uniform mixing of raw materials should be avoided because it results in a heterogeneous property in phosphor powders, forming the main factor of variation in production reproducibility. For this reason, it is necessary to make uniform the masses of powdery raw materials, such as sulfur, $Na_2CO_3$, and $Li_2CO_3$. The criterion for the mass homogenization had better refer to the particle mass of the raw material $Y_2O_3$ (ca. 3.5 μm in particle size measured through sedimentation). To obtain highly emissive fluorescent substances, the particle diameter of the raw material $Y_2O_3$ should be as small as possible. However, it is difficult to make the particle diameter of $Y_2O_3$, under the restriction imposed on industrial production, less than the above specified 3.5 μm. All the raw material powders except $Y_2O_3$ and the activator oxides, which have passed through a 60-mesh sieve, desirably a 100-mesh sieve, may be used practically.

When fine powders are mixed, when raw material powders are stored in high-temperature high-humidity rooms, or when weighings are conducted in high-humidity rooms, powders are caused to aggregate as a result of absorbing moisture in the air through capillary condensation. Such aggregated particles should be prevented from use because their use is equivalent to using large-size raw material powders. Therefore, the storage, weighing, and preparation of raw material powders are necessary to be conducted in rooms where the relative humidity is lower than 50%.

The uniformly mixed powdery raw materials are put into an alumina crucible with airs included in the powders being removed sufficiently. To remove air in the powers, the crucible may be mechanically vibrated. The airs in the powders should be removed not only because they are a thermal insulator which prevents raw material powders from being heated uniformly, but also because, when heated abruptly, they cause powder bumping, resulting in furnace pollution.

The crucible, in which the raw material powder has been put, is sealed with a crucible lid made of alumina. The crucible is transferred into a muffle, and the muffle is heated. In this process, the temperature is to be held around 150° C. for about 30 min. for the purpose of removing water from the mixed powders and air bubbles in the powders. In addition, if the muffle is held for 30 min. to 60 min. at a temperature (e.g., 600° C.) slightly higher than the melting point of the alkali metal sulfide to be formed by the reaction of the alkali metal with sulfur, favorable results may be obtained since the surfaces of the particles of $Y_2O_3$ and activator compounds are enveloped with the flux. After such a pretreatment has been conducted, the temperature of the muffle is raised to about 800° C. and held there for about 30 min. and thus a favorable result may be obtained since the conversion of $Y_2O_3$ into $Y_2O_2S$ is advanced to completion without the particle diameter of $Y_2O_3S$ being enlarged. After the $Y_2O_3$ has thus been converted into $Y_2O_2S$, the crucible is to be heated by raising the temperature of the muffle to the temperature at which the specified particle diameter is obtained. When the heating temperature exceeds 1100° C., consideration needs to be taken to prevent no air from entering the muffle atmosphere from the muffle outside.

Figure 25:
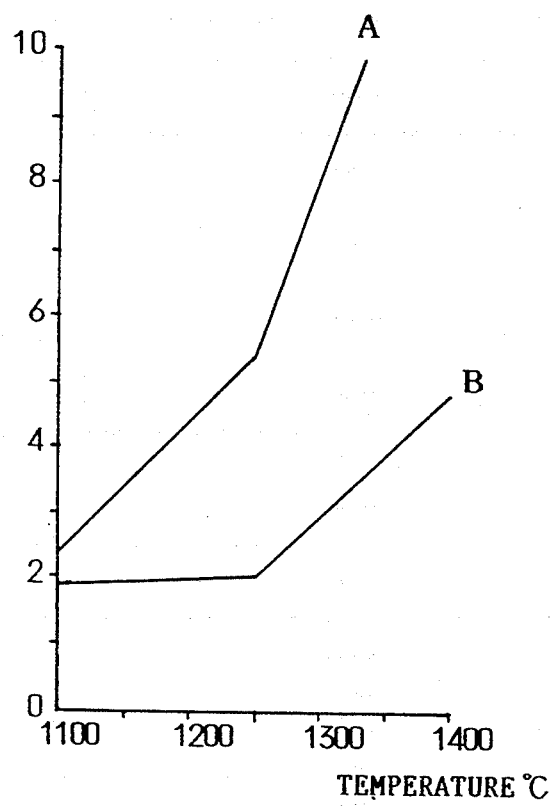
FIG. 25 is a graph showing the change of diameter of great circle of a $Y_2O_2S$ particle, which depends on temperature of material.

Each of the spherical particles obtained consists of a polycrystal having a plurality of crystal axes inside. The curve A in FIG. 25 shows the change in the median particle diameter of spherical particles with heating temperature. It may be understood that a polycrystal is rapid in crystal growth. Therefore, to obtain spherical particles with a given particle diameter, it is necessary to control strictly the heating time within the crucible. Since the thermal conduction is not good in the powdery mixture within the crucible, a short-time heating produces fluorescent substances with wide particle size distributions. In order to obtain fluorescent substances with narrow particle size distributions, it is necessary to hold the crucible at the given temperature for a long time. Practically, when a 500-ml crucible is used, a temperature hold for 2 to 3 hours is necessary. The growth of fine single crystals is in contrast to the case of polycrystals. Fine single crystals grow with slow speeds of crystal growth. The curve B in FIG. 5 shows the dependence of the growth speed of fine single crystals on heating temperature.

The sufficiently heated crucible is allowed to be cooled gradually down to near room temperature so that the alumina may be prevented from being damaged from thermal distortion. In the cooled crucible, we obtain a heated rod having been sintered by the solidification of the flux. If we remove only the flux from this heated rod, we may obtain a powder, an aggregate of phosphor particles. To remove the flux, the heated rod needs to be soaked in a hot water at 70° C. to 90° C. The flux gets dissolved into the hot water, though gradually. To remove the flux completely, it is effective to allow the fluorescent substance to be suspended for several hours in vigorously stirred hot water. To get a good result, the above-described operation is to be repeated several times.

Then, the surface of the particles need to be etched by use of 1-N hydrochloric or nitric acid. For the etching to be effected uniformly on all the particles, the acid solution, having the fluorescent substance suspended, must be stirred as vigorously as possible. In this manner, the surface of particles may be etched selectively.

For example, $Y_2O_2S$ phosphor powders may be etched with nitric or hydrochloric acid. To make the surface of $Y_2O_2S$ fluorescent substance rough, 3 to 40% acid concentrations are available, favorable results are obtained at acid concentrations of 5 to 20%, and the most desirable result is obtained at acid concentrations of 8 to 10%. If the acid concentration is lower than 3%, the surface of the fluorescent substance cannot be etched sufficiently by the acid. The powders, after being etched, are subjected to washing with pure water several times in order to get rid of the remaining acid.

The etched surface of a fluorescent substance is unstable chemically and physically so as to get polluted by moisture, air, carbon dioxide, and so on when exposed to air. The etched surface is stabilized by being suspended in diluted phosphoric acid or an aqueous solution of a phosphoric compound. To stabilize the surface of all powders uniformly, the suspended solution should effectively be stirred vigorously with a view to prevent the sedimentation of particles. Favorable concentrations of phosphoric acid are in the range of 0.1% to 30%, the range of 1% to 10% is more desirable, and the most desirable result may be obtained in the range of 3% to 6%. In the case of using a solution of sodium phosphate, a good result may be obtained in the range of 1% to 20%, and a favorable result may be obtained in the range of 1% to 10%. After having the surface stabilized, the phosphor powders are washed several times with pure water to get rid of the remaining phosphoric acid and phosphate.

After washing, water is removed by filtration, and drying is effected by using a dryer heated at 150° C. After drying, sieving is conducted at room temperature using a 400-mesh sieve, the powders passing through the sieve yield phosphor powders excellent in flowing. These powders are aggregates composed of primary particles which are approximately-spherical and have rough surfaces. When an application onto the phosphor screen of a cathode-ray tube is made with these powders, a phosphor screen is obtained which is highly superior in membrane property, compared to the conventional fluorescent substances.

In what follows are described concrete examples of methods of producing phosphor powders. $Y_2O_3$ (100 g), S (50 g), $Eu_2O_3$ (4.0 g), $Na_2CO_3$ (35 g), $Li_2CO_3$ (20 g), and $Na_2HPO_4$ (5 g), all having passed through a 100-mesh sieve, are weighed out in a dry room into a glass bottle. This glass bottle is subjected to a 1-day mixing using a ball mill device. The raw material after the mixing is transferred into a 200-ml alumina crucible, and a mechanical vibration is given on the crucible to get rid of the air in the raw material powders. The crucible has its lid applied and then put into an electric furnace (muffle) to be heated. The heating is conducted in such a way that the temperature is kept at 150° C. for 30 min., then at 600° C. for 30 min. and at 800° C. for 30 min., and finally at a high temperature of 1200° C. for 2 hours. At the end of the final heating, the electric furnace is turned off to cool the crucible. When the temperature of the electric furnace has reached almost the room temperature, the crucible is taken out of the electric furnace. In the crucible, a hard-sintered mixture of phosphor powders and flux is found in a form of a rod. This rod is taken out of the crucible and is kept soaked in hot water at 80° C. in a stainless container. The flux is caused to dissolve selectively into the hot water and thus only the phosphor powders are allowed to deposit on the bottom of the container. After the hot water with the flux dissolved has been taken out, the phosphor powders are again suspended in hot water at 80° C. and the suspension is stirred violently. By stirring in such a way, the flux remaining on the surface of the phosphor particles may be removed. The stirring time is 3 hours. After this operation is over, the solution with the flux dissolved is taken out, and the powders are subjected to rinsing approximately twice with pure water. The powders after the rinsing are suspended in a 10% nitric acid solution, which is vigorously stirred for 2 hours. After the stirring, the acid solution is taken out, and rinsing with pure water is conducted approximately twice. Then, the powders are suspended in a 5% phosphoric acid solution, which is stirred strongly for about 1 hour. The phosphoric acid solution is taken out, and the phosphor powders are rinsed several times with pure water. The rinsing effect is augmented if we employ a filtering operation after each rinsing. The fluorescent substance which has been through rinsing is separated from its contained water by Filtration and dried for 5 hours in a dryer warmed at 130°C. The dried phosphor powders are sieved with a 400-mesh sieve; in this sieving, powders consisting of primary particles distributed according to the logarithmic normal distribution will come through the sieve. The median particle diameter of this fluorescent substance is 4.5 $\mu$m according to the microscopic method. And, each particle is a near-spherical particle with its surface made rough. The phosphor powder thus obtained is easily applicable onto a face plate (extrate) by means of the ordinary PVA-fluorescent substance slurry method.

When $Eu_2O_3$ is used as an activator, a phosphor powder capable of developing red color may be obtained; if we select known activators and use similar procedures as described above, we may obtain phosphor powders capable of developing a green or white color. For a phosphor powder capable of developing blue color, we use, for example, a phosphor powder composed mainly of zinc sulfide powder.

When a phosphor powder obtained in the above-described method was applied onto a face plate (extrate), we found a remarkable improvement in the areas of pinhole, cross-contamination, pattern cut, and so on, and the resolving power augmented. In addition, on a cathodoluminescent apparatus, the emission intensity of the phosphor screen was found increased.

It should be noted that the phosphor powders relating to the present invention may, of course, be used suitably as phosphor powders for cathodic tubes of television receivers, computers, etc., which applications are in themselves included in the present invention.

I claim:
1. A cathodoluminescent apparatus, comprising:
    a line electrode gun having a line cathode elongated in a first direction;
    said line electron gun including an intermediate electrode for extracting electrons from said line cathode;
    an anode for accelerating electrons extracted from said line cathode, said anode having a extrate and an electrically conductive section formed thereon for accepting a voltage applied thereto for the acceleration;
    said anode including a phosphor screen formed of phosphor particles on said electrically conductive section;
    said intermediate electrode having a configuration permitting direct linear focusing of said extracted electrons upon said phosphor screen in a contiguous line parallel to said line cathode and extending a distance substantially equal to a length of said line cathode;
    said intermediate electrode having portions for scanning said contiguous line in a single second direction perpendicular to said first direction; and
    a container being capable of accommodating said line electron gun and said anode, said container having a light emitting face, through which visible light is capable of passing, said container being evacuated to a vacuum for cathodoluminescence.
2. The cathodoluminescent apparatus according to claim 1, wherein,
    said intermediate electrode has a first intermediate electrode for extracting electrons from said line cathode, and a second intermediate electrode for linearly focusing electrons extracted and reciprocatively scanning electrons focused in the second direction.
3. The cathodoluminescent apparatus according to claim 1, wherein,
    said intermediate electrode has a first intermediate electrode for extracting electrons from said line cathode, a second intermediate electrode for linearly focusing electrons extracted,
    and a third intermediate electrode for reciprocatively scanning electrons focused in the second direction.
4. The cathodoluminescent apparatus according to claim 1, wherein,
    said line cathode has a ceramic core, a wire heater, which is wound round said ceramic core, and an oxide layer, which coats over said wire heater.
5. The cathodoluminescent apparatus according to claim 1, wherein,
    said line cathode has a hollow cylinder section, a coil heater which is accommodated in said cylinder section, and an oxide layer, which coats over the outer circumferential face of said cylinder section.
6. The cathodoluminescent apparatus according to claim 1, wherein,
    there are provided a plurality of said intermediate electrodes, each of which is capable of independently operating, in said container.
7. The cathodoluminescent apparatus according to claim 1, wherein,
    there are provided a plurality of groups, each of which comprises said anode and said phosphor screen, in said container.
8. The cathodoluminescent apparatus according to claim 7 wherein,
    said groups are mutually partitioned by black members.
9. The cathodoluminescent apparatus according to claim 1, wherein,
    said anode is divided into a plurality of parts, and said phosphor screen is divided into a plurality of parts.
10. The cathodoluminescent apparatus according to claim 9, wherein,
    said parts are mutually partitioned by black members.

11. A cathodoluminescent apparatus, comprising:
a plurality of line electron guns each having a line cathode, which is elongated in a first direction, and an intermediate electrode for extracting electrons from said line cathode;
each of said line electron guns having an anode for accelerating electrons extracted from said line cathodes, said anode having an electrically conductive section formed on a extrate, wherein voltage is applied thereto for the acceleration;
a phosphor screen being made of phosphor particles on said electrically conductive section;
each of said intermediate electrode having a configuration permitting direct linear focusing of said extracted electrons upon said phosphor screen in a contiguous line parallel to said line cathode and extending a distance substantially equal to a length of said line cathode;
said intermediate electrode having portions for scanning said contiguous line in a single second direction perpendicular to said first direction; and
a container being capable of accommodating said plurality of line electron guns and said anode, said container having a light emitting face, through which visible light is capable of passing, said container being evacuated to a vacuum for cathodoluminescence.

* * * * *

UNITED STATES PATENT AND TRADEMARK OFFICE
CERTIFICATE OF CORRECTION

PATENT NO. : 5,440,200
DATED : August 8, 1995
INVENTOR(S) : Ryuji Ozawa

It is certified that error appears in the above-identified patent and that said Letters Patent is hereby corrected as shown below:

Item [86] on the title page:
The 102(e) date is --October 27, 1992--.

Signed and Sealed this

Fifth Day of December, 1995

Attest:

BRUCE LEHMAN

Attesting Officer   Commissioner of Patents and Trademarks